United States Patent
Howe

(10) Patent No.: US 10,787,224 B2
(45) Date of Patent: Sep. 29, 2020

(54) PEDAL POWERED VEHICLE

(71) Applicant: Thomas M. Howe, Augusta, KS (US)

(72) Inventor: Thomas M. Howe, Augusta, KS (US)

(*) Notice: Subject to any disclaimer, the term of this patent is extended or adjusted under 35 U.S.C. 154(b) by 239 days.

(21) Appl. No.: 16/020,666

(22) Filed: Jun. 27, 2018

(65) Prior Publication Data

US 2018/0304963 A1 Oct. 25, 2018

(51) Int. Cl.
| | |
|---|---|
| *B62M 1/10* | (2010.01) |
| *F03G 1/02* | (2006.01) |
| *B62M 1/36* | (2013.01) |
| *F03G 1/08* | (2006.01) |
| *B62K 5/02* | (2013.01) |
| *B62K 5/003* | (2013.01) |

(52) U.S. Cl.
CPC .............. *B62M 1/10* (2013.01); *B62K 5/003* (2013.01); *B62K 5/02* (2013.01); *B62M 1/105* (2013.01); *B62M 1/36* (2013.01); *F03G 1/02* (2013.01); *F03G 1/08* (2013.01); *F03G 2730/01* (2013.01)

(58) Field of Classification Search
CPC . B62M 1/10; B62M 1/105; F03G 1/00; F03G 1/02; F03G 1/08; F03G 2730/01
See application file for complete search history.

(56) References Cited

U.S. PATENT DOCUMENTS

| | | |
|---|---|---|
| 299,979 A | 6/1884 | Godley |
| 448,208 A | 3/1891 | Carmichael |
| 531,607 A | 12/1894 | Wilson |
| 672,089 A | 4/1901 | Brittain |
| 740,114 A | 9/1903 | Fiske |
| 1,182,576 A | 5/1916 | Larue |
| 1,217,935 A | 3/1917 | Gephart |
| 1,284,072 A | 11/1918 | Dun Lany |
| 1,328,402 A | 1/1920 | Schiffl |
| 1,374,797 A * | 4/1921 | Zaborsky ................. B62M 1/10 280/215 |

(Continued)

FOREIGN PATENT DOCUMENTS

| | | |
|---|---|---|
| CN | 102562988 | 12/2014 |
| CN | 103573952 | 3/2016 |

(Continued)

*Primary Examiner* — Jacob D Knutson
*Assistant Examiner* — Michael R Stabley
(74) *Attorney, Agent, or Firm* — Kenneth H. Jack; Davis & Jack, L.L.C.

(57) ABSTRACT

A wheeled vehicle incorporating a frame; a drive shaft mounted upon the frame, the drive shaft having rotary power input and output ends; a drive wheel mounted upon the frame; a rotary power output linkage operatively interconnecting the drive shaft's output end and the drive wheel; rotary power pedals mounted upon the frame; a rotary power input linkage operatively interconnecting the drive shaft's input end and the rotary power pedals; a spiral spring having a rotary power input end and a rotary power output end, the spiral spring being mounted over the drive shaft; a clutch and one way bearing combination for anchoring the spiral spring's rotary power input end upon the drive shaft and upon the frame; and a one way bearing and brake combination for alternatively anchoring the spiral spring's rotary power output end upon the drive shaft and upon the frame.

13 Claims, 4 Drawing Sheets

(56) References Cited

U.S. PATENT DOCUMENTS

| | | | | |
|---|---|---|---|---|
| 1,409,454 | A | * | 3/1922 | Kolaczkowski ......... B62M 1/10 280/214 |
| 1,527,242 | A | | 2/1925 | Weil |
| 1,572,051 | A | * | 2/1926 | Sullivan .................. B62M 1/10 280/215 |
| 1,595,266 | A | | 8/1926 | Boucher |
| 1,673,197 | A | | 6/1928 | Kollmann |
| 1,798,971 | A | * | 3/1931 | Clements ................ B62M 1/30 280/215 |
| 2,638,359 | A | * | 5/1953 | Crumble ................. B62M 1/10 280/215 |
| 2,835,344 | A | | 5/1958 | Allen |
| 2,908,356 | A | * | 10/1959 | Daarud ................... B62M 1/10 185/39 |
| 3,047,094 | A | | 7/1962 | Oblazney |
| 3,194,343 | A | | 7/1965 | Sindlinger |
| 3,894,615 | A | * | 7/1975 | Lew ........................ B62M 9/00 185/39 |
| 3,941,075 | A | * | 3/1976 | Rupenian .............. B60F 3/0084 440/12.62 |
| 3,946,453 | A | | 3/1976 | Black |
| 4,108,459 | A | * | 8/1978 | Alvigini ................. B62M 1/10 185/39 |
| 4,305,599 | A | * | 12/1981 | Houston ................. B62M 1/10 185/39 |
| 4,416,464 | A | * | 11/1983 | Mattox ................... B62M 1/10 280/215 |
| 5,590,741 | A | | 1/1997 | Storms |
| 5,880,532 | A | | 3/1999 | Stopher |
| 6,019,385 | A | * | 2/2000 | Kelley ..................... B60T 1/10 280/217 |
| 6,035,970 | A | * | 3/2000 | Conte .................... B62M 1/105 185/39 |
| 6,053,830 | A | * | 4/2000 | Glaeser ................. B62M 1/105 280/215 |
| 6,199,664 | B1 | | 3/2001 | Tkaczyk et al. |
| 6,523,646 | B1 | | 2/2003 | Gates |
| 6,825,574 | B1 | | 11/2004 | Mooring |
| 6,880,677 | B2 | | 4/2005 | Chio |
| 7,626,279 | B2 | | 12/2009 | Brown et al. |
| 7,673,893 | B2 | * | 3/2010 | Jan ......................... B62M 1/105 185/37 |
| 8,240,690 | B2 | * | 8/2012 | Wills ...................... B62M 1/10 280/214 |
| 8,251,389 | B2 | * | 8/2012 | Juan ....................... B62M 23/02 180/205.1 |
| 8,534,404 | B2 | * | 9/2013 | Juan ........................ B60K 6/00 180/165 |
| 8,632,087 | B2 | * | 1/2014 | Coghill, Jr. ............. B60T 1/10 280/214 |
| 9,061,171 | B2 | | 6/2015 | Hsieh |

FOREIGN PATENT DOCUMENTS

| | | |
|---|---|---|
| FR | 863569 | 4/1941 |
| FR | 879865 | 3/1943 |
| GB | 142178 | 6/1920 |
| GB | 338222 | 8/1929 |
| JP | 60119385 | 6/1985 |
| JP | 20082637939 | 10/2008 |

\* cited by examiner

PEDAL POWERED VEHICLE

FIELD OF THE INVENTION

This invention relates to pedal powered tricycles, quadricycles, and the like. More particularly, this invention relates to such vehicles which are specially adapted for storing excess pedal powered rotational torque as potential spring energy, and for selectively releasing such stored potential energy for subsequent assistance in propulsion of the vehicle.

BACKGROUND OF THE INVENTION

In use of commonly known pedal powered tricycles and quadricycles, such vehicles are often driven and propelled over level road surfaces or along downhill road surfaces. During passages of such vehicles over such surfaces, an operator pedaling the vehicle is commonly able to maintain a desired speed through an application of a minimal or small level of pedaling exertion. During such level or downhill operation of such conventional pedal powered vehicle, the operator typically is capable of applying pedaling power to the vehicle at a level which exceeds that which is necessary to maintain the desired speed. However, in many circumstances such an application of additional pedaling power only results in the production of an undesirably excessive vehicle speed. Accordingly, typical and conventional pedal powered tricycle and quadricycles undesirably waste or discourage the operator's capability of providing additional pedaling exertion and power during level or downhill travel.

The instant inventive pedal powered vehicle solves or ameliorates the problems, defects, and deficiencies of conventional vehicles described above by mechanically associating with the vehicle's drive train a specialized assembly of springs and power transmission gears which are adapted for initially capturing and storing the above described excess pedaling power as potential spring energy, and for subsequently releasing such potential energy for assistance in maintaining speed while traversing uphill grades.

BRIEF SUMMARY OF THE INVENTION

A first structural component of the instant inventive pedal powered vehicle comprises a support frame or chassis to which substantially all of the other essential components of the invention are mounted and attached. In a preferred embodiment, the invention's frame component is comprised of a rigid lattice or weldment of tubular aluminum alloy struts, rails, beams, and columns. For the sake of materials cost economy, the invention's frame component may be alternatively composed of steel.

A further structural component of the instant inventive wheeled vehicle comprises a drive shaft which is rotatably mounted upon the frame. In a preferred embodiment, the invention's drive shaft component is aligned with the vehicle's longitudinal or front to rear axis, the vehicle typically rolling and moving forwardly or longitudinally along such axis.

A further structural component of the instant inventive wheeled vehicle comprises at least a first drive wheel. In a preferred embodiment, the vehicle comprises either a tricycle or a quadricycle, and the invention's drive wheel component comprises either a left rear wheel or a right rear wheel. While the inventive vehicle may assume a bicycle configuration, at least a first laterally positioned stabilizing wheel is preferably provided. A forward steerable wheel or wheels are preferably additionally provided along with an associated steering wheel or rotatable handle bars.

Further structural components of the instant inventive vehicle comprise a rotary power output linkage which operatively interconnects a power output end of the drive shaft with the vehicle's drive wheel. In a preferred embodiment, the vehicle's output linkage comprises a rear differential or a 45° gear train which is adapted for translating rotation of the drive shaft about the longitudinal axis into drive wheel turning torque. Suitably, the invention's rotary power output linkage may comprise and incorporate a gearbox transmission having neutral and reverse settings, or may comprise another type of variable ratio transmission such as a multiple speed planetary hub gear or a CVT (continuously variable transmission) hub gear.

Further structural components of the instant inventive vehicle comprise rotary power input pedals which are operatively mounted upon the frame adjacent to a frame mounted seat component. In a preferred embodiment, the invention's pedal assembly allows a seated and forwardly forward facing operator to utilize leg driven foot pedaling motions for powering the vehicle. Suitably, multiple sets of pedals may be incorporated where the vehicle is adapted for carrying multiple riders. Hand pedals for hand driven operation of the vehicle may be suitably substituted.

Further structural components of the instant inventive assembly comprise rotary power input linkages which operatively interconnect the pedals with the input end of the vehicle's drive shaft. In a preferred embodiment, the invention's rotary power input linkage comprises a variable ratio transmission which incorporates derailleur gears, a multiple speed planetary hub gear, a continuously variable planetary transmission (CVT) hub gear, or a gearbox transmission.

Further structural components of the instant inventive vehicle comprise a spiral spring having a rotary power input end and a rotary power output end. The invention's spiral spring component is necessarily mounted over the drive shaft component in the manner of a quill and stem combination (the spiral spring constituting the quill component and the drive shaft constituting the stem component). In a preferred embodiment, a radially inner end of the spiral spring serves as such spring's rotary power input end, and a radially outer end of such spring serves as the rotary power output end. Suitably, such input end may be alternatively positioned radially outwardly.

In a preferred embodiment, the invention's spiral spring component is longitudinally segmented to form a longitudinal train or series of spiral sub-springs each of which has a spring inner end which is rotationally linked with an adjacent sub-spring's outer end. In a preferred embodiment, the segments of the spiral spring component and such segments' sub-springs form an oppositely longitudinally increasing series of spring strengths or spring constants.

Further structural components of the instant inventive wheeled vehicle comprise means for fixedly interconnecting the spiral spring's rotary power input end and the drive shaft and for anchoring such spring end against counter-rotation with respect to the frame. Suitably, the fixed connection between the drive shaft and the spring's input may comprise a rigid and immovable mechanical connection and, in a preferred embodiment, such connection may comprise a slip clutch which alternatively joins the drive shaft with the spring's input end and releases such connection. Drive shaft engaging operation of such slip clutch means allows powered rotation of the drive shaft to wind the spring. Frame engaging operation of such means allows the spring to dispense stored rotary power at the spiral spring's rotary power output end while the spring's rotary power input end remains counter-rotationally anchored with respect to the frame. In a preferred embodiment, such means' frame anchoring component comprises a one way rotary bearing or one way "lock-up" bearing which is operatively connected to the spring's rotary power input end for, for example, freely permitting clockwise winding of such end while resisting any counter-clockwise unwinding motion of such end. Other commonly known mechanisms for selectively imparting rotational torque to structures such as a spring end and for resisting and permitting rotational motions of such spring end are considered to fall within the scope of the invention. For example, friction wheel and releasable brake assemblies and combinations capable of imparting and controlling such motions are considered to fall within the scope of the invention.

Further structural components of the instant inventive wheeled vehicle comprise means for alternatively anchoring the spiral spring's rotary power output end upon the drive shaft and upon the frame. In a preferred embodiment, such means comprise a second one way rotary or lock-up bearing which, for example, mechanically links clockwise rotary motion of the spiral spring's rotary output end with clockwise rotary driving of the drive shaft. Such means preferably further comprise a mechanical association of a frame anchored releasable brake with the spiral spring's rotary power output end.

In operation of such brake component, engagement of the brake prevents the rotary power output end of the spiral spring from rotating and unwinding while the assembly's slip clutch is engaged for winding the spring's input end. Rotation of the drive shaft during such spring winding is freely permitted by the provision of a second one way or lock-up bearing component. The second one way bearing translates rotary power from the spiral spring to the drive shaft while the first one way bearing (or the engaged slip clutch) anchors the opposite end of the spring with respect to the frame and against counter-clockwise unwinding. Similarly with the invention's means for anchoring the spiral spring's power input end upon the drive shaft and upon the frame, the invention's output end means for alternative anchoring is considered to include and be represented by various commonly known mechanisms which are capable of restricting rotational directions, and alternatively permitting and resisting rotation.

In operation of the instant inventive wheeled vehicle, and assuming provisions of preferred components as described above, an operator of the vehicle may be seated, and may initially disengage both the invention's slip clutch and the invention's brake. Thereafter, the operator may commence pedaling to propel the vehicle over a level road surface. In the event the operator feels that he or she has sufficient leg strength for applying a pedaling force above that which is needed to maintain a desired forward speed, the operator may simply and conveniently engage both the invention's slip clutch and brake. Upon such engagements, the operator's pedaling motion immediately commences to wind the spiral spring at a sub-spring segment which has a lowest spring strength or spring constant. Upon full winding of such sub-spring segment, a next sub-spring segment having a next greater spring constant commences to be wound.

In the event that the operator finds that the winding of such next sub-spring segment entails too much force or is too tiring, the operator may downshift the invention's preferably provided variable ratio transmission to allow for continued spring winding and forward propulsion of the vehicle.

The above process of successively downshifting for continued pedal powered winding of the spring sub-segments may continue until each of the spiral spring's progressively tensioned segments is fully wound. At the spiral spring's fully wound state, it carries a maximum level of stored or potential spring energy while the spring's rotary power input end remains rotationally fixed with respect to the frame by the invention's first one way bearing component, and while the invention's rotary output end is similarly rotationally fixed by the invention's engaged brake. A subsequent release of the brake advantageously allows the stored rotary power of the spring to translate to the rotary power output end of the drive shaft via rotating engagement of the invention's second one way clutch. Thus, the instant inventive vehicle advantageously allows excess pedaling energy to be accumulated during level or downhill road travel, and to be subsequently utilized for assistance in uphill travel.

Accordingly, objects of the instant invention include the provision of a pedal powered wheeled vehicle which incorporates structures as described above and which arranges those structures in relation to each other in manners described above for the achievement of the functions and benefits described above.

Other and further objects, benefits, and advantages of the instant invention will become known to those skilled in the art upon review of the Detailed Description which follows, and upon review of the appended drawings.

DETAILED DESCRIPTION OF PREFERRED EMBODIMENTS

Figure 1:
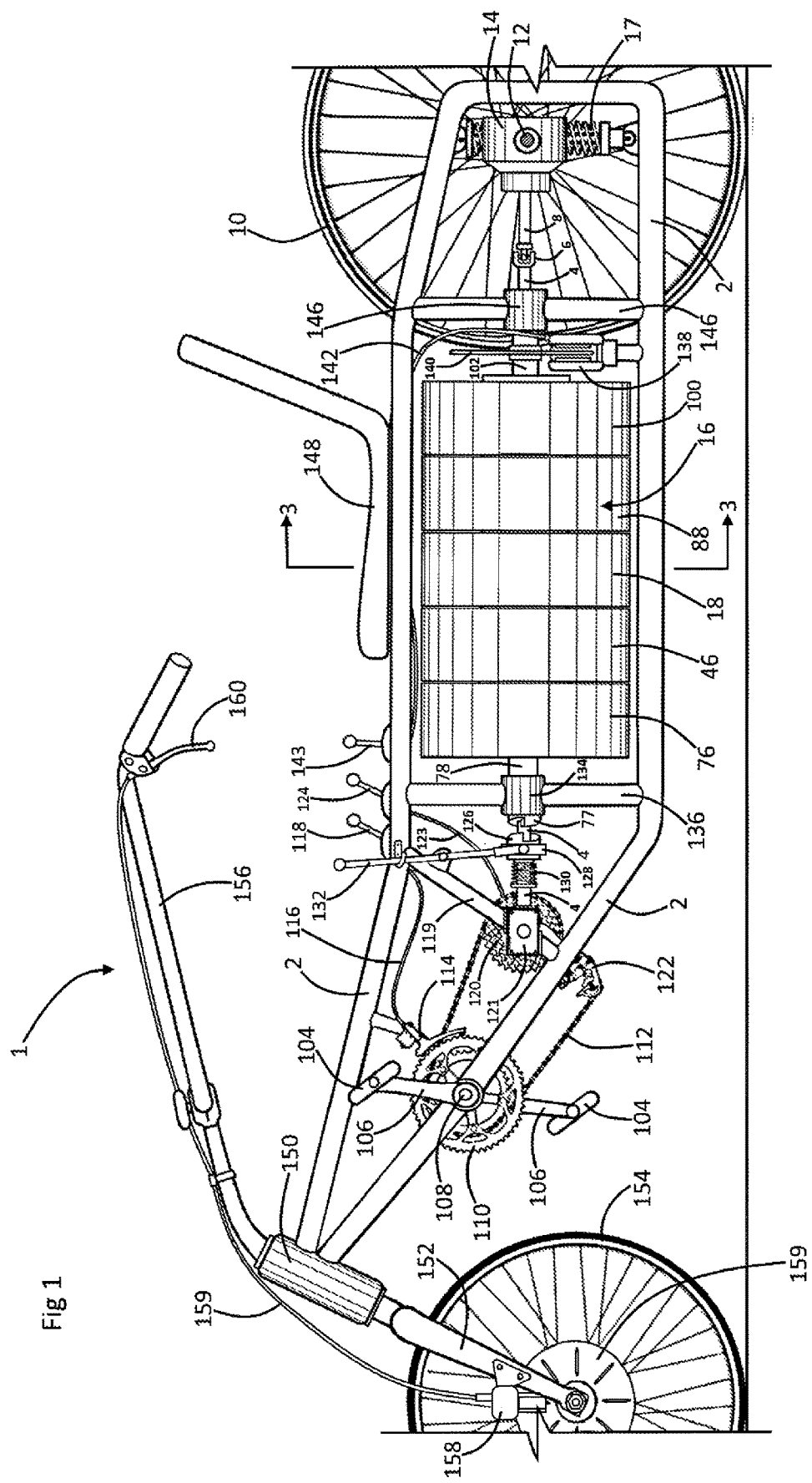
FIG. 1 is a side view of a preferred embodiment of the instant inventive pedal powered vehicle.

Referring now to the drawings, and in particular to Drawing FIG. 1, a preferred embodiment of the instant inventive pedal powered vehicle is referred to generally by Reference Arrow 1. The vehicle 1, as drawn in an exemplary and representational fashion, constitutes a tricycle having a single steerable front wheel 154 and a rearward powered or driven wheel 10. For purposes of understanding of structures within the view, the vehicle's left rear stabilizing wheel is not drawn, and the vehicle's left lateral axle 12 is shown cut off.

The vehicle 1 has a tubular support frame 2 whose forward end includes a steering hub 150 which rotatably supports a front fork 152 and left and right handlebars 156. A caliper brake 158 and disk 159 assembly which is actuated by a hand brake lever 160 and an actuator cable 159 controls rotation of the front wheel 154 for braking of the vehicle 1.

A drive shaft 4 extends longitudinally along the frame 2, such drive shaft being supported upon the frame 2 at support braces 119, 136, and 146. Pedals 104 and crank arms 106 are rotatably mounted at rotation hub 108 to the frame 2, such pedals 104 and crank arms 106 turning forward derailleur sprockets 110. A continuous loop chain 112 extends over the forward derailleur sprockets 110 and a forward derailleur element 114 operates to deflect the chain 112 for selective engagements with such sprockets. The front derailleur element 114 is actuated via co-axial cable 116 and actuator lever 118.

The chain 112 engages rear derailleur sprockets 120 which are similarly controlled by a rear derailleur element 122, such element being actuated by co-axial cable 123 and lever actuator 124. Rotary torque about the lateral axis provided via pedals 104, sprockets 110, chain 112, and sprockets 120, is translated to rotation about the longitudinal axis via a gearbox 121 including meshing 45° gears (not within views). The rotary power input end of the drive shaft 4 is connected to the rotary power output of the gearbox 121. The depicted derailleur system 110,114,112,120,122 is intended as being representative of other suitably substituted variable ratio transmissions such as planetary hub gears, CVT hub gears, and gear box transmissions.

Upon an initial disengagement of a slip clutch 77,126, and upon disengagement of a rear caliper brake 138 (as depicted in FIG. 1) pedaling power provided by an operator seated upon seat 148 applied to pedals 104 translates to sprockets 110, to chain 112, to sprockets 120, to the gearbox 121, to drive shaft 4, to a rear universal joint 6, to a rear drive shaft segment 8, and to the vehicle's rear drive differential 14 for conventionally powering of the vehicle's drive wheel 10. During such conventional powered operation of the vehicle 1, road bumps encountered at the rear wheels are cushioned by shock absorbing spring and strut assemblies 17.

A provided spiral spring component of the instant inventive vehicle improves upon such conventional operation, such spring being referred to generally by Reference Arrow 16. Spiral spring 16 preferably comprises multiple oppositely-longitudinally stacked segments 76, 46, 18, 88, and 100. Referring simultaneously to all figures, the central spring segment 18 is configured substantially identically with its longitudinally adjacent spring segments 76 and 46 with its oppositely-longitudinally adjacent spring segments 88 and 100. Spring segment 18 preferably comprises a cylindrical case 19 whose oppositely longitudinal end is closed by an axially apertured disk shaped wall 20. A power transfer nipple 22 is fixedly attached to and extends oppositely longitudinally from wall 20, the hollow bore 24 of such nipple 22 oppositely longitudinally extending the axial aperture of wall 20.

Radially inwardly extending key ridges 26 extend longitudinally and are arrayed annularly about the inner periphery of the cylindrical case 19, such ridges 26 slidably engaging key channels 34 which open radially outwardly from a nesting cylindrical spring housing 32. Such housing radially inwardly comprises a hub element 28 which, similarly with the spring housing 32, forms radially inwardly opening key channels 30.

A spiral spring 36 mounted with the annulus of housing 32,28 has a radially inner end 38 which is fixedly mounted to hub 28 by means of screws 40, and has a radially outer end 42 which is fixedly mounted to the spring housing 32 by screws 44.

The oppositely longitudinally extending nipple 50 of the immediately longitudinally adjacent spring segment 46 is configured substantially identically with nipple 22 of spring segment 18, such nipple 50 having, like the key ridges 23 of nipple 22, radially arrayed and longitudinally extending key ridges 51. Accordingly, in assembly of spring segment 18, spring housing 32 slides oppositely longitudinally into place within case 19 with key ridges 26 slidably engaging key channels 34 while the channels 30 of hub 28 similarly slidably receive the key ridges 51 of nipple 50. Such convenient mode of assembly allows rotational movement of the radially inner end 38 of the spring 36 to be fixed only in relation to nipple 50, while rotational movement of the outer end 42 of the spring 36 is fixed only in relation to the cylindrical spring case 19 and its rigidly attached nipple 22.

An oppositely longitudinally adjacent thicker and stiffer spiral sub-spring 90 is preferably provided. With respect to sub-spring 36, sub-spring 90 is represented as having a greater spring constant via an increased radial thickness of its spring turns. Such mode of representation of a spring constant differential is intended as being representative of other suitably substituted means for imposing spring constant differentials among the sub-springs. For example, different longitudinal spring turn dimensions may be utilized. Also, different spring materials may be utilized. Alterations in the number of turns of the spiral springs may also be utilized to ascribe the differing spring constants character to the sub-springs. As depicted, the spiral sub-spring of segment 76 (not depicted within views) has a lowest spring constant, the spiral sub-spring of segment 100 (not depicted within views) has a highest spring constant, sub-spring 36 has an intermediate spring constant, sub-spring 66 has a spring constant between those of the segment 76's spring and spring 36, and sub-spring 90 has a spring constant between those of spring 36 and that of segment 100. Thus, spiral spring 16, as depicted, includes a series of differing spring constant sub-springs which progressively steps up in the oppositely longitudinal direction. Suitably, different arrays, arrangements, and ordering of the spring segment series may be provided.

Radially inner and radially outer ends 92 and 96 of sub-spring 90 are mounted to a similarly configured spring housing 87 within a similarly configured and adjacently oppositely longitudinally positioned cylindrical case 87 of segment 88. In such segment 88, the inner and outer ends of spring 90 are secured via screws 98 and 94, ridges 89 and 23, case 87, and hub 21 in the same manner as sub-spring 36.

The longitudinally adjacent sub-spring 66 is also similarly mounted with respect to power transfer nipple 78 of segment 76 via cylindrical case and wall 47,48, slide ridges 62, spring housing 61, screws 74 mounting sub-spring outer end 72, screws 70 mounting sub-spring inner end 68, hub 64 and slide ridges 82. Sub-springs within segments 76 and 100 (not shown within views) are further similarly configured and mounted.

Drive shaft 4 extends longitudinally through the hollow bores of the spiral spring's power transfer nipples (e.g., nipples 78, 50 and 22) and hollow annuluses are thereby formed between the shaft and the nipples (e.g., annuluses 80, 54, and 24). Free rotating support of the drive shaft 4 within such annuluses is provided by radial support rotary bearings (e.g., rotary bearing 84, 58, 56, and 25). To allow close stacking of the power transfer nipples and cylindrical cases without rotational interference among the segments, longitudinal support rotary bearings (e.g., bearings 86 and 60) are disposed between the oppositely longitudinal ends of the power transfer nipples and the longitudinal faces of the cases' disk shaped walls (e.g., bearings 86 and 60 at junctures 78,48 and 50,20).

In order to operate the spiral spring 16, means for anchoring the power input end of segment 76's sub-spring against counter-rotating with respect to frame 2 and for anchoring such spring end with respect to drive shaft 4 are provided. Suitably, the means for anchoring the power input end of the spring 16 upon the drive shaft 4 may comprise a simple rigid and non-disconnectable attachment. However, in a preferred embodiment such means may comprise an alternatively engageable and releasable slip clutch 126,77. The longitudinal half 126 of slip clutch 126,77 may have a non-circular bore which may slidably move longitudinally and oppositely longitudinally along a short and matchingly non-circular portion of shaft 4. Such clutch half may rotate within a rotary bearing ring 128 which is carried and driven longitudinally and oppositely longitudinally by a lever assembly 132. A rearward pull upon the upper handle of lever assembly 132 drives ring bearing 128 and clutch half 126 longitudinally against an engagement biasing spring 130, and out of engagement with clutch half 77. Hook 133 may hold such assembly in the disengaged position depicted in FIG. 1.

Figure 4:
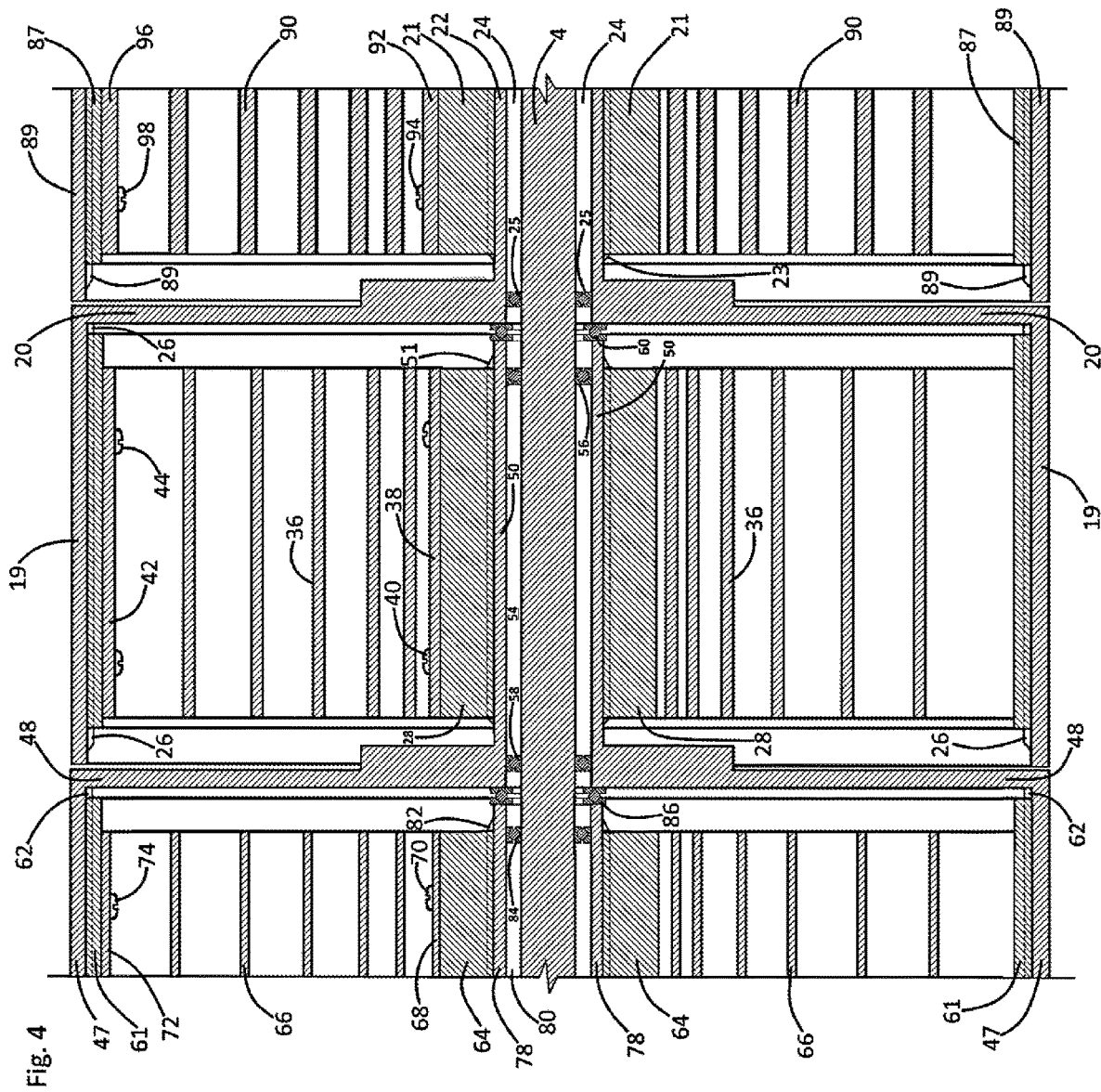
FIG. 4 is an alternative sectional view 90° removed from the view direction of the FIG. 3 sectional view.

A release of lever 132 from hook 133 allows spring 130 to drive clutch half 126 oppositely longitudinally into engagement with clutch half 77. Such clutch half is preferably rigidly mechanically linked with the longitudinal end of the assembly's forwardmost power transfer nipple 78, the oppositely longitudinal end of such nipple 78 being depicted in FIG. 4. Upon such engagement of clutch 126,77, and upon provision of pedal powered torque to drive shaft 4, brake lever 143 may be pulled from its FIG. 1 position to its FIG. 2 position. Such lever action is translated by co-axial actuator cable 142 to close brake caliper 138.

In the event that the spiral spring 16 has been previously wound, brake 138,102 may be released while clutch 126,77 remains engaged and while pedaling continues. Upon such brake release, continued clockwise rotation of the clutch 126,77 with the shaft 4 effectively anchors the power input end of the spring 16 with respect to the frame 2 and against any counter-clockwise unwinding rotation. Such anchoring allows any and all unwinding dissipation of the spring's energy to occur at the spring's power output end.

Such rotary power output of the spring 16 operates the rear lock-up bearing 146 via power transfer nipple 102 to rotatably engage and turn the drive shaft 4. The outer case of lock-up bearing 146 (i.e., the portion of such bearing which is exposed to view in FIGS. 1 and 2) receives the oppositely longitudinal end of output nipple 102, while such nipple axially receives the oppositely longitudinal end of drive shaft 4. The radially outer annulus of such bearing 146 preferably includes free turning bearing elements, while the radially inner annulus of such bearing 146 (i.e., the annulus bounded by the inner periphery of output nipple 102 and the outer periphery of the drive shaft 4) preferably includes one way lock up elements (not depicted within views). Thus, the specialized bearing element 146 rotationally supports both the oppositely longitudinal end of spring 16 and the drive shaft 4, while requiring that the rotary power output nipple 102 either translate its rotation to shaft 4 or remains neutral with respect to shaft 4's rotation. Disengagement of brake 138,140 while spiral spring 16 is wound allows the spring 16 compliment or assist in the pedaling propulsion of the vehicle 1.

In the event that clutch 126,77 is disengaged while the spring 16 remains wound and while brake 138,140 remains engaged, the forward one way or lock-up clutch 134 alternatively anchors the rotary power input end of the spring 16 with respect to the frame 2. Thus, a release of brake 138,140 allows spring energy stored in spiral spring 16 to propel the vehicle while no pedaling power is being applied.

The one way bearing 146 in combination with the brake 138,140 constitute means for alternatively anchoring the rotary output of spring 16 to the shaft 4 and with respect to the frame 2. Other commonly known rotation controlling mechanisms which are capable of performing those functions are considered to fall within the scope of the invention.

Figure 2:
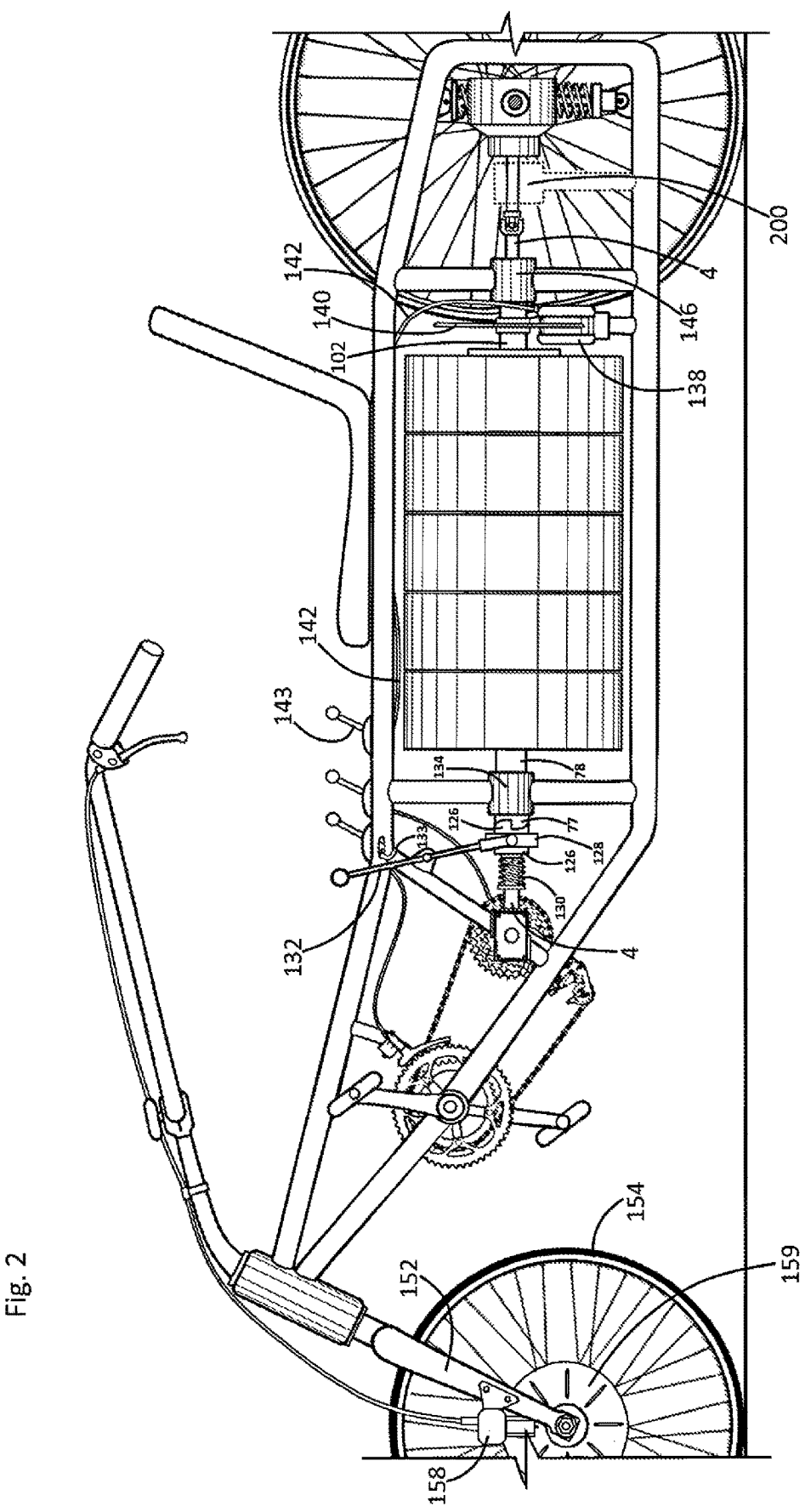
FIG. 2 redepicts the structure of FIG. 1, the view of FIG. 2 showing slip clutch and brake components at alternative settings.
Figure 3:
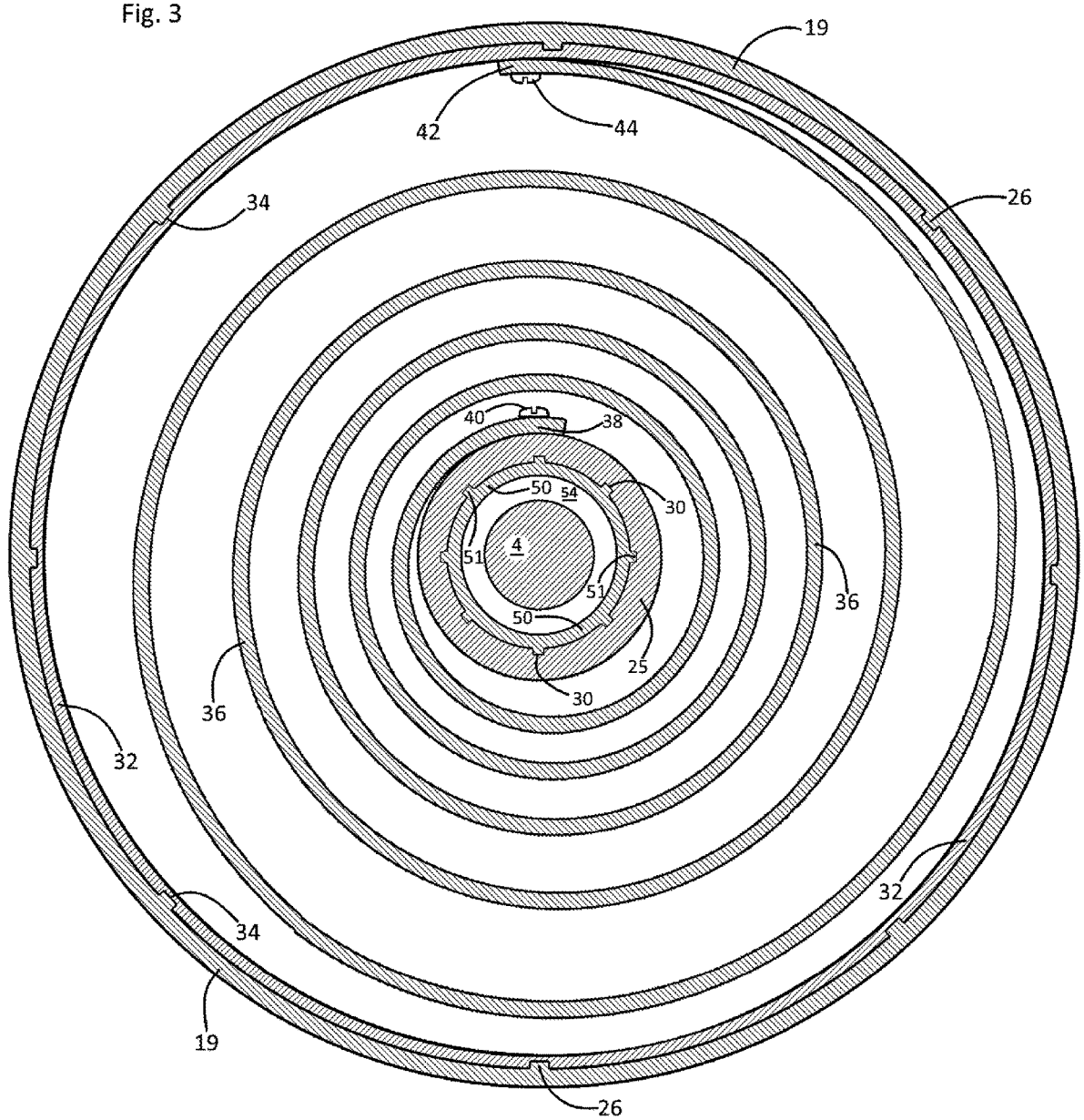
FIG. 3 is a sectional view as indicated in FIG. 2.

Referring to FIG. 2, the dashed line structure 200 is representative of a provision of additional variable transmission gears including a neutral setting, and/or a reverse gear which may be utilized for modification of the power output of drive shaft 4.

During pedal powered winding of the segments of the spiral spring 16, the segment having a least spring constant will become wound first, and the segment having a greatest spring constant will become wound last. By progressively shifting gears 110,120 from a high gear ratio (at which the operator may wind the sub-spring having the lowest spring constant) to a lowest gear ratio (at which the operator may wind the assembly's highest spring constant sub-spring), the operator may progressively wind all of the segments of the spring 16 during normal or downhill vehicle propulsion. In the event that supplemental gears 200 are provided, and in the event that such supplemental gears include a neutral setting, an operator may utilize pedal power to wind the spring 16 while gears 200 are set at neutral and while the vehicle 2 remains motionless.

In the event that the vehicle 1 is at a hilltop, and the spring 16 is unwound, the vehicle may coast downhill. Such coasting may advantageously impart winding rotary torque to the spring 16. Accordingly, the invention may beneficially convert gravitational potential energy at a hilltop into stored spring energy for assistance in propulsion of the vehicle to a next hilltop.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A wheeled vehicle comprising:
    (a) a frame;
    (b) a drive shaft mounted upon the frame, the drive shaft having rotary power input and output ends;
    (c) a drive wheel mounted upon the frame;
    (d) a rotary power output linkage operatively interconnecting the drive shaft's output end and the drive wheel;
    (e) rotary power pedals mounted upon the frame;
    (f) a rotary power input linkage operatively interconnecting the drive shaft's input end and the rotary power pedals;
    (g) a spiral spring having a rotary power input end and a rotary power output end, the spiral spring being mounted over the drive shaft;
    (h) means for joining the drive shaft with the spiral spring's rotary power input end and for anchoring said end against unwinding rotation; and
    (i) means for alternatively anchoring the spiral spring's rotary power output end upon the drive shaft and upon the frame, wherein the means for joining the drive shaft with the spiral spring's rotary power input end comprise a slip clutch.

2. A wheeled vehicle comprising:
    (a) a frame;
    (b) a drive shaft mounted upon the frame, the drive shaft having rotary power input and output ends;
    (c) a drive wheel mounted upon the frame;
    (d) a rotary power output linkage operatively interconnecting the drive shaft's output end and the drive wheel;
    (e) rotary power pedals mounted upon the frame;

(f) a rotary power input linkage operatively interconnecting the drive shaft's input end and the rotary power pedals;

(g) a spiral spring having a rotary power input end and a rotary power output end, the spiral spring being mounted over the drive shaft;

(h) means for joining the drive shaft with the spiral spring's rotary power input end and for anchoring said end against unwinding rotation; and (i) means for alternatively anchoring the spiral spring's rotary power output end upon the drive shaft and upon the frame, wherein the spiral spring comprises a plurality of segments, each segment comprising a sub-spring having a rotary power input end and a rotary power output end, each sub-spring having a spring end connection selected from the group consisting of a rotary power output to rotary power input attachment and a rotary power input to rotary power output attachment.

3. The wheeled vehicle of claim 2 wherein the sub-spring of one of the segments has a spring constant which is greater than that of another segment's sub-spring.

4. The wheeled vehicle of claim 3 wherein the rotary power input linkage comprises a variable ratio transmission.

5. The wheeled vehicle of claim 4 wherein the means for alternatively anchoring the spiral spring's rotary power input end upon the drive shaft and upon the frame comprises a clutch connected operatively to the drive shaft.

6. The wheeled vehicle of claim 5 wherein the means for alternatively anchoring the spiral spring's rotary power input end upon the drive shaft and upon the frame further comprises a one way bearing operatively interconnecting said end and the frame.

7. The wheeled vehicle of claim 6 wherein the means for alternatively anchoring the spiral spring's rotary power output end upon the drive shaft and upon the frame comprises another one way bearing operatively interconnecting said end and the drive shaft.

8. The wheeled vehicle of claim 7 wherein the means for alternatively anchoring the spiral spring's rotary power output end upon the drive shaft and upon the frame further comprises a brake operatively interconnecting said end and the frame.

9. The wheeled vehicle of claim 8 further comprising a seat mounted upon the frame adjacent the rotary power pedals and a plurality of actuators mounted upon the frame adjacent the seat, said actuators being adapted for operating the clutch and the brake.

10. The wheeled vehicle of claim 9 further comprising a steerable wheel mounted upon the frame and a stabilizing wheel mounted upon the frame.

11. The wheeled vehicle of claim 1 wherein each segment comprises a case and a hub, wherein the power input end of said each segment's sub-spring is fixedly attached to a structure selected from the group consisting of said each segment's hub and said each segment's case, and wherein the power output end of said each segment's sub-spring is fixedly attached to said group's other structure.

12. The wheeled vehicle of claim 11 comprising a nipple fixedly attached to and extending from one of the segments' cases, the nipple being nestingly received within another segment's hub.

13. The wheeled vehicle of claim 12 further comprising a rotary bearing extending annularly between the nipple and the drive shaft.

\* \* \* \* \*